United States Patent [19]

Taka et al.

[11] Patent Number: 5,751,431
[45] Date of Patent: May 12, 1998

[54] DIGITAL IMAGE FORMING APPARATUS CAPABLE OF EASILY INSTALLING AND REMOVING OPTICAL SCANNER UNIT

[75] Inventors: Kyosuke Taka, Nara; Keiji Masuda, Tenri; Kan Mukai, Yamatokoriyama, all of Japan

[73] Assignee: Sharp Kabushiki Kaisha, Osaka, Japan

[21] Appl. No.: 607,484

[22] Filed: Feb. 27, 1996

[30] Foreign Application Priority Data

Mar. 16, 1995 [JP] Japan .................................. 7-057538

[51] Int. Cl.⁶ .................. H04N 1/29; H04N 1/04; G03G 21/00
[52] U.S. Cl. .................. 358/296; 358/300; 358/474; 399/110; 399/118
[58] Field of Search .................. 358/296, 300, 358/400, 401, 471, 474, 480; 346/145; 347/108, 138, 152, 170, 222, 245, 263; 250/208.1; 399/107, 110, 118

[56] References Cited

U.S. PATENT DOCUMENTS

| | | | |
|---|---|---|---|
| 4,236,807 | 12/1980 | Kuehnle | 355/3 R |
| 4,251,153 | 2/1981 | Levine | 355/3 R |
| 4,403,763 | 9/1983 | Dold | |
| 4,403,851 | 9/1983 | Yanagawa | |
| 4,511,237 | 4/1985 | Kawata et al. | 355/3 R |
| 4,588,282 | 5/1986 | Levine | 355/3 R |
| 4,647,178 | 3/1987 | Sasaki et al. | 355/3 R |
| 5,038,028 | 8/1991 | Boyd et al. | 250/208.1 |

FOREIGN PATENT DOCUMENTS

| | | |
|---|---|---|
| 0503431A2 | 9/1992 | European Pat. Off. . |
| A 61-195070 | 8/1986 | Japan . |
| A 62-270967 | 11/1987 | Japan . |
| A 4291273 | 10/1992 | Japan . |
| 623877 | 3/1994 | Japan .................. G03G 15/00 |

*Primary Examiner*—Eric Frahm

[57] ABSTRACT

A digital image forming apparatus equipped with an optical scanner unit which is detachable from a main body includes an upper image reading section and a lower part image forming section. The apparatus is arranged such that the optical scanner unit can be installed and removed in and from the apparatus in a vertical direction, and can be removed through an opening provided for removing the image forming section therethrough. According to the described arrangement, during the installation and removal of the optical scanner unit, removal of the image reading section and a special opening for the optical scanner unit are not required, thereby reducing the restriction on structural design of the apparatus and permitting easy installation and removal of the optical scanner unit. As a result, the maintenance of the apparatus can be performed with an improved efficiency.

13 Claims, 10 Drawing Sheets

DIGITAL IMAGE FORMING APPARATUS CAPABLE OF EASILY INSTALLING AND REMOVING OPTICAL SCANNER UNIT

FIELD OF THE INVENTION

The present invention relates to a digital image forming apparatus provided with an optical scanner unit which is detachable from a main body.

BACKGROUND OF THE INVENTION

A digital image forming apparatus equipped with an optical scanner unit which is detachable from a main body typically includes in its upper part an image reading section, and in its lower part an image holding member and an image forming section. The image reading section outputs a document image in a form of an electric image signal using a line image sensor, etc. The image forming section develops an electrostatic latent image formed on an image holding member and transfers it onto a sheet, and also performs cleaning. The optical scanner unit is provided for forming an electrostatic latent image on a surface of a photoreceptor by scanning an optical image by projecting thereon a laser beam. The described optical scanner unit is provided between the image reading section and the image forming section in consideration of a space, image forming processes, etc.

The optical scanner unit and the image forming section including the image holding member, etc., are respectively composed of many members which are often subject to cleaning and exchange, etc., and for the described purposes, the optical scanner unit and the image forming section are often removed from the digital image forming apparatus.

However, in conventional digital image forming apparatuses, an opening is formed that only allows the image forming section to be installed and removed in a horizontal direction, and in such structure, the installation and removal of the optical scanner unit are performed from above the apparatus. Namely, to perform such installation and removal of the optical scanner unit, the installation and removal of the image reading section provided thereabove are also required, thereby requiring a troublesome process and a lengthy time for such operations.

In order to eliminate the described inconveniences, Japanese Examined Patent Publication No. 23877/1994 (Tokukohei 6-23877) discloses a digital image forming apparatus provided with an opening 82 which permits installation and removal of an optical scanner unit 81 to be performed in a horizontal direction (in a direction of an arrow in the figure) with respect to a main body of a digital image forming apparatus 80 as shown in FIG. 11. FIG. 11 shows a state where an optical scanner unit 81 is installed in the digital image forming apparatus 80. In the state shown in FIG. 11, only by the removal of an attachment screw 83, can the installation and removal of the optical scanner unit 81 in and from the main body of the digital image forming apparatus 80 be performed in a direction of the arrow without difficulties.

However, the digital image forming apparatus of Japanese Examined Patent Publication No. 23877/1994 (Tokukohei 6-23877) has the following drawbacks.

That is, such apparatus has a strict restriction on its structural design because a special opening 82 is required for removing the optical scanner unit 81, and also because other members of the apparatus such as a feeding section, an image forming section, etc., cannot be provided in the path for removal of the optical scanner unit 81.

SUMMARY OF THE INVENTION

An object of the present invention is to provide a digital image forming apparatus which is relatively unrestricted in its structural design and permits easy installation and removal of an optical scanner unit in and from the apparatus.

In order to achieve the above object, a digital image forming apparatus in accordance with the present invention is characterized by including:

an image reading section for outputting image information by scanning an image;

an image holding member;

an image forming section, provided under the image reading section, for forming an image on the image holding member;

an optical scanner unit provided between the image reading section and the image forming section, for exposing the image holding member by an optical signal converted from the image information to form an electrostatic latent image; and an installation and removal unit provided in the main body, for installing and removing the optical scanner unit in a vertical direction, wherein the installation and removal unit includes an opening for removing therethrough the image forming section from the main body, and the opening is formed such that the optical scanner unit can pass therethrough.

According to the described arrangement, the image information read by the image reading section is converted into an optical signal by the optical scanner unit. Then, the image holding member is exposed by the optical signal to form an electrostatic latent image on the surface thereof. Then, the resulting electrostatic latent image is visualized by the image forming section.

For maintenance purposes, the image forming section and the optical scanner unit are removed from the main body of the apparatus. In such a case, the optical scanner unit is located in such a manner that it can be installed in and removed from the installation and removal unit in a vertical direction, the removal of the optical scanner unit can be performed with relative ease. Additionally, as the installation and removal unit has an opening which allows the image forming section and the optical scanner unit to be removed therethrough from the apparatus.

Therefore, the described arrangement permits easy removal of the optical scanner unit from the digital image forming apparatus, thereby resulting in a significant reduction in time required for maintenance. Additionally, as the special opening for the optical scanner unit can be omitted, the restriction on the structural design for the apparatus can be reduced.

For a fuller understanding of the nature and advantages of the invention, reference should be made to the ensuring detailed description taken in conjunction with the accompanying drawings.

DESCRIPTION OF THE EMBODIMENTS

Figure 1:
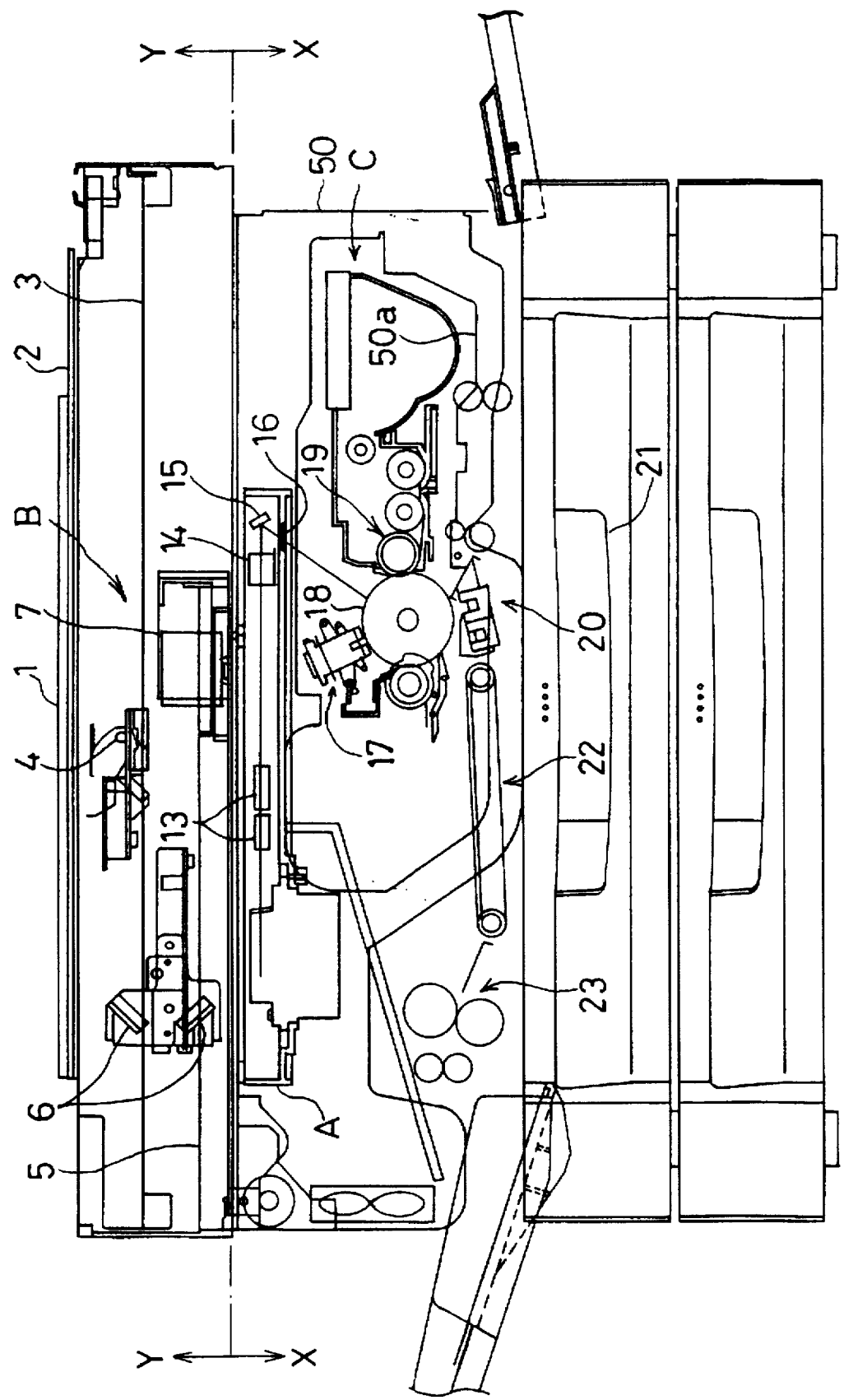
FIG. 1 is a cross-sectional view showing a schematic structure of a digital image forming apparatus of the present invention.

The following descriptions will discuss the preferred embodiment of the present invention as illustrated in FIG. 1 through FIG. 10.

In the explanation of a digital image forming apparatus in accordance with the present embodiment, first, image forming and fixing processes will be explained with reference to FIG. 1.

When a document 1 is placed on a platen glass 2, a lamp 4 which moves along a slide rail 3 at a velocity V starts scanning the document 1. An image pattern formed on the document 1 is transferred to a CCD unit 7 in a form of an optical image through an optical system including 2-3 mirror units 6, etc., which moves on a slide rail 5 at a velocity V/2. Then, the optical image is converted into an electric signal in the CCD unit 7. The electric signal is transmitted to an image processing section (not shown), and is converted into an output signal for projecting a laser beam. For convenience in explanation, a structure for reading the document 1 placed on the platen glass 2 and converting it into the electric signal is hereinafter referred to as an image reading section B (image reading means).

Figure 2:
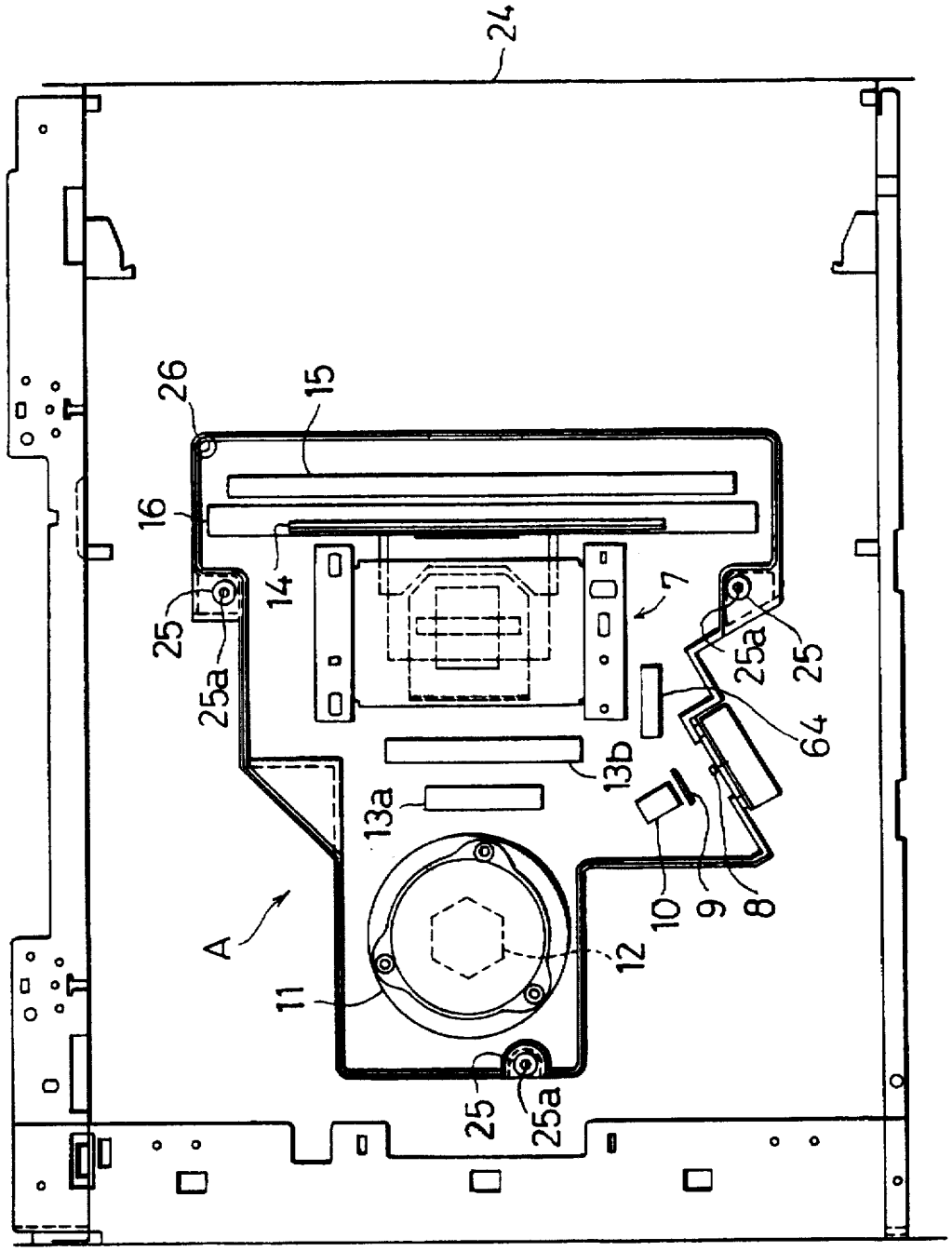
FIG. 2 is a cross-sectional perspective view taken along the lines X—X of FIG. 1.

When an output signal is inputted to an optical scanner unit A, as shown in FIG. 2, an output signal is inputted to a laser emitting section 8, and a laser beam is emitted therefrom. The laser beam is converged by a slit 9 and is further converged by a collimator lens 10. Thereafter, the laser beam is reflected by a rotating polygon mirror 12 and is transmitted through F$\theta$-lens 13a·13b and a cylindrical lens 14. Then, the light beam is reflected by a mirror 15 and is transmitted through a transmitting member 16 to be emitted to the outside of the optical scanner unit A.

Then, the laser beam is projected on a photoreceptor 18 (image holding member) which is uniformly charged beforehand by a charger 17. As a result, a charge is removed from the photoreceptor 18 in accordance with an image pattern formed on the document 1, thereby forming a latent image on the photoreceptor 18.

Next, in a developing section 19, a toner is made adhere to a charge-removed part of the latent image to form a toner image by reverse-development. Then, the resulting toner image is copied to a sheet supplied from a feed tray 21 in a transfer section 20. The sheet is transported to a fusing section 23 by a sheet transport section 22, where the toner image is permanently affixed to the sheet. Then, the sheet is discharged to complete the image forming process.

The features of the optical scanning unit A will be described below. As shown in FIG. 2, a polygon mirror motor 11 is provided in a triangular inner section formed by fixing sections 25 so as to prevent a deformation of a bottom plate of the optical scanner unit A due to a weight of the polygon mirror motor 11. The CCD 7 is also provided in the triangular inner section so that fixing vises 40 (FIG. 4) can be tightened in the fixing sections 25 from above without being disturbed.

Figure 3:
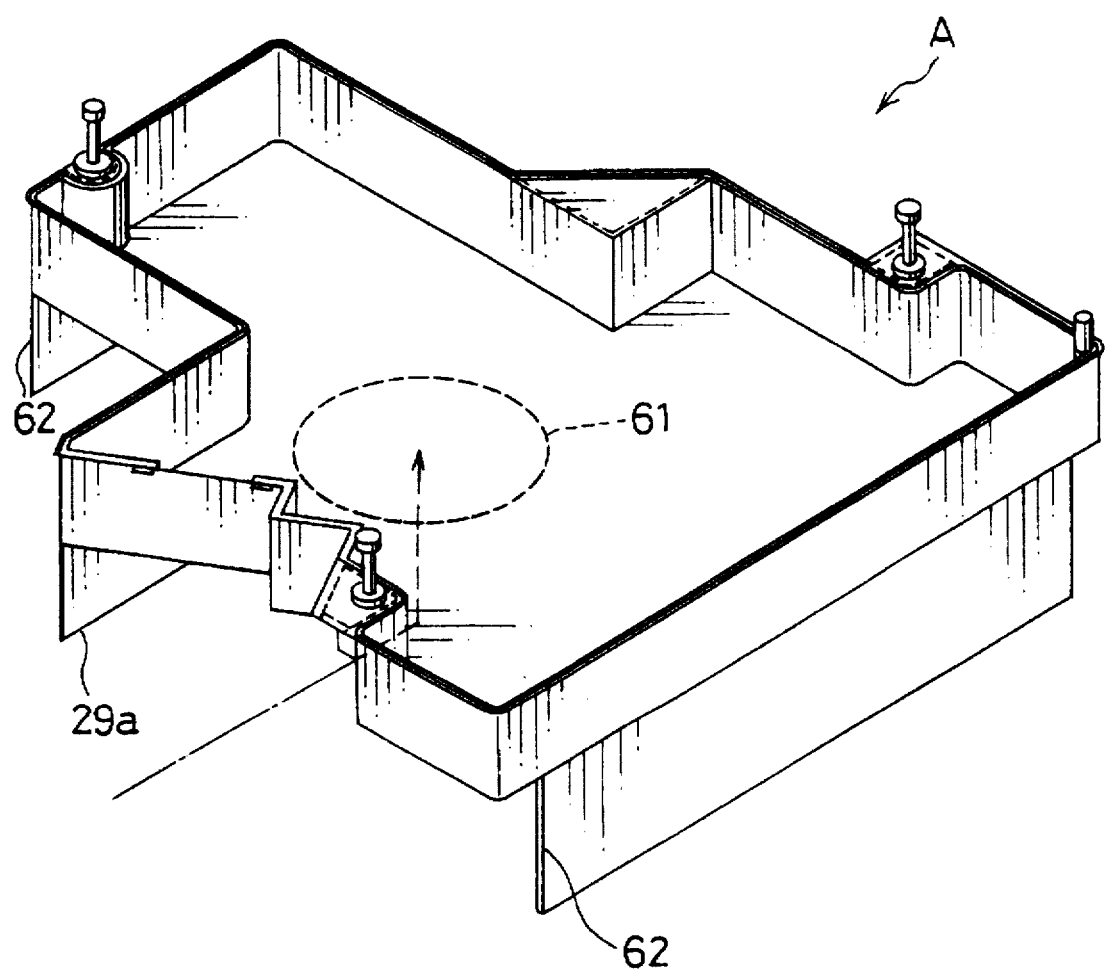
FIG. 3 is a perspective view schematically showing an outer structure of an optical scanner unit provided in the digital image forming apparatus of FIG. 1.

As shown in FIG. 3, a knurling tool 61 is formed as a hole on the bottom surface of the optical scanner unit A. In this arrangement, by supporting the optical scanner unit A in the knurling tool 61 with hands in the direction of an arrow, the problem of dropping the optical scanner unit A by slipping it through hands can be prevented.

Figure 4:
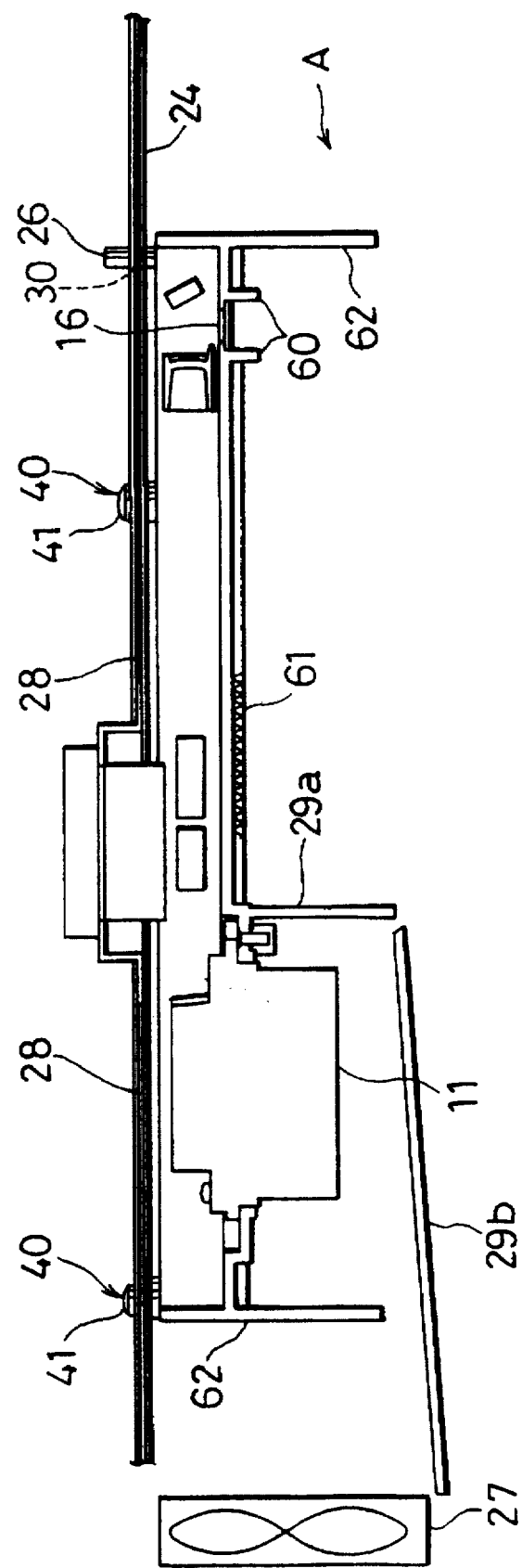
FIG. 4 is a cross-sectional view showing a schematic structure of essential parts of the optical scanner unit provided in the digital image forming apparatus of FIG. 1.

As shown in FIG. 4, the lower portion of the polygon mirror motor 11 is projected from the bottom surface of the optical scanner unit A. The polygon mirror motor 11 is provided in a path of an air flowing towards a cooling fan 27 through a clearance formed between an optical scanner unit fixing plate 24 (installation and removal unit) and the upper surface portion of the optical scanner unit A. As a result, the polygon mirror motor 11 is cooled off by the air-flow generated from the upper portion to the bottom portion of the polygon mirror motor 11. Additionally, air-duct walls 29a and 29b are formed surrounding the polygon mirror motor 11 to allow the air-flow thus generated to pass therethrough, thereby effectively cooling off the polygon mirror motor 11 with out requiring a special cooling fun.

In the air-duct walls 29a and 29b, the vertically formed air-duct wall 29a is integrally formed with the optical scanner unit A, and is projected downward from the bottom portion of the polygon mirror motor 11. According to the described arrangement, when removing the optical scanner unit A for placement on a placement surface, such as a floor, etc., the air-duct wall 29a (cushioning member) contacts the placement surface, thereby preventing the polygon mirror motor 11 from having an impact when contacting the placement surface.

On the bottom surface of the optical scanner unit A, support projections 62 (cushioning member) are formed with the same height as the air-duct wall 29a. The support projections 62 are provided for forming a space which allows a user's hand to be inserted at the bottom and a stable placement condition of the optical scanner unit A so as to make the maintenance easier. Like the aforementioned case of the air-duct wall 29a, the optical scanner unit A can be prevented from having an impact to the polygon mirror motor 11 contacting the placement surface.

When a user's hand is inserted at the bottom of the optical scanner unit A for its installation and removal, a finger tip may touch a transmission member 16 which transmits to a laser beam to be projected onto the photoreceptor 18, and this may result in the problem of contaminating the transmission member 16. Furthermore, if such dirty transmission member 16 is used, the problem of lowering the resolution of a latent image formed on the photoreceptor 18, or a reproduction inferior of an image pattern, and the like may occur. To eliminate such problem, projections 60 are formed in a vicinity of the bottom surface of the transmission member 16 to prevent it from being touched with a finger.

With respect to the optical scanner unit A having the described features, the mechanism of permitting the installation and the removal in and from the digital image forming apparatus will be explained below.

As shown in FIG. 2, the optical scanner unit A is provided with fixing sections 25 respectively including female threaded members 25a at three portions. Each securing section 25 is provided for fixing the optical scanning unit A and ensuring that the optical scanning unit A to be mounted with accuracy by the uniform upper surface of the fixing section 25.

Figure 5:
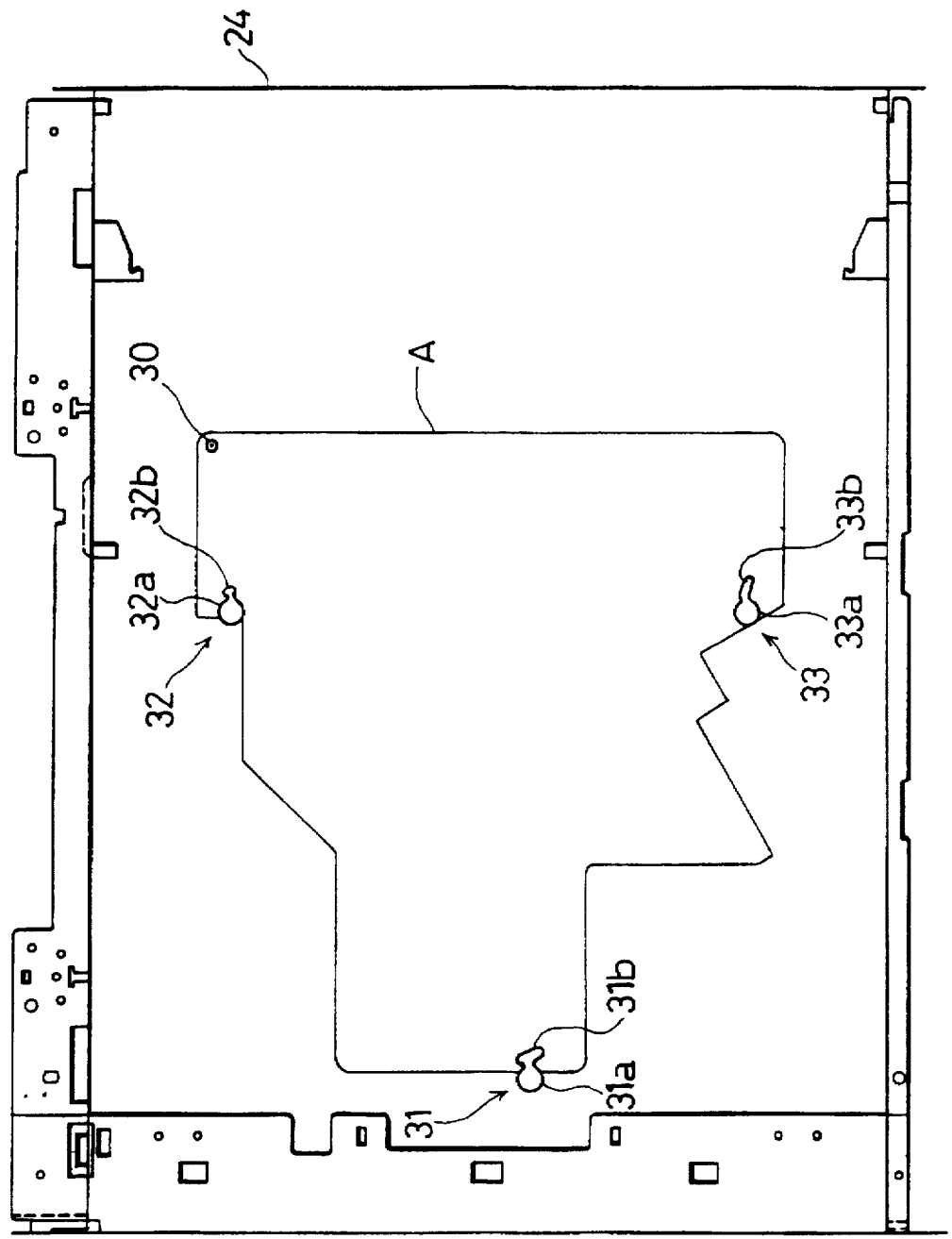
FIG. 5 is a cross-sectional view taken along the lines Y—Y of FIG. 1.

As shown in FIG. 5, on the side of the optical scanner unit fixing plate 24, deformed holes 31, 32 and 33 are formed at three portions respectively corresponding to the fixing sections 25. When seen from above, the optical scanner unit A is mounted at the position shown in FIG. 5 with respect to the optical scanner unit fixing plate 24.

Figure 6:
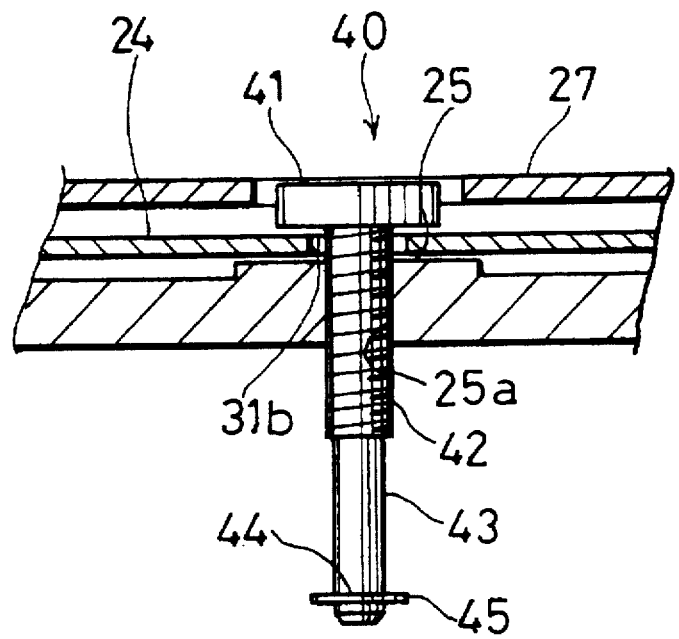
FIG. 6 is an enlarged cross-sectional view showing a fixing state where a fixing section of the optical scanner unit is fitted into a deformed hole of an optical scanner unit fixing plate.

The deformed holes 31, 32 and 33 are respectively arranged such that round holes 31a, 32a and 33a (first hole) and arc holes 31b, 32b and 33b (second hole) which are formed in an arc shape about the reference hole 30 are respectively connected. As shown in FIG. 6, the optical scanner unit A is fixed to the optical scanner unit fixing plate 24 in the round hole of the deformed hole, for example, in the arc hole 31b by the fixing vise 40. Each fixing vise 40 is composed of a circular head portion 41, a male threaded portion 42 and a non-threaded portion 43. The non-threaded portion 43 has a smaller diameter than that of the ridge of the female threaded member 25a, and has an E-ring groove 44 at the leading end thereof. When the fixing vise 40 is used, an E-ring 45 which has a larger diameter than that of the ridge of the female threaded member 25a is fitted in the E-ring groove 44.

In order to smoothly carry out the installation of the optical scanning unit A onto the optical scanner unit fixing plate 24, each fixing vise 40 is inserted to the fixing section 25 beforehand to fit the E-ring 45. As a result, even in the state where the male threaded portion 42 of the fixing vise 40 is not tightened in the female threaded member 25a, the fixing vise 40 cannot be taken off through the fixing section 25.

Furthermore, the outer diameter of the head portion 41 is smaller than that of the round holes 31a, 32a and 33a shown in FIG. 5, and is larger than the width of the arc holes 31b, 32b and 33b. The diameter of the ridge of the male threaded portion 42 is smaller than the width of the arc holes 31b, 32b and 33b.

In the described arrangement, the operation of removing the optical canner unit A will be explained.

From the digital image forming apparatus shown in FIG. 1, first, the image forming section C (image forming means) including the photoreceptor 18, the developer section 19, the transfer section 20 and the fixing section 23, etc., is removed through the opening 50a provided in a front frame 50. As a result, a space which allows the optical scanner unit A to be removed from the digital image forming apparatus is formed. Such opening 50a enables the optical scanner unit A to be removed without inclining it.

Next, as shown in FIG. 4, in the state where the platen glass 2 is taken out, the head portions 41 of the fixing vises 40 appear at the top. From this state, by loosening the fixing vises 40, first, a positioning pin 26 fitted to the reference hole 30 of the optical scanner unit fixing plate 24 is released. Then, when completely loosening the fixing vises 40, the optical scanner unit A is hung on the optical scanner unit fixing plate 24 by the head portions 41 respectively fitted in the arc holes 31b and 32b and 33b (not shown) and the E-rings 45. As described, even in the state where the fixing vises 40 are completely loosened, the removing operation of the optical scanner unit A can be continued without dropping the optical scanner unit A.

Then, the knurling tool 61 of the optical scanner unit A is supported from the bottom portion. In this state, the projection 60 formed in a vicinity of the transmission member 16 prevents the transmission member 16 from being touched with a finger, and the like, thereby eliminating the problem of skin oil and other contaminants from adhering to the transmission member 16.

Figure 7:
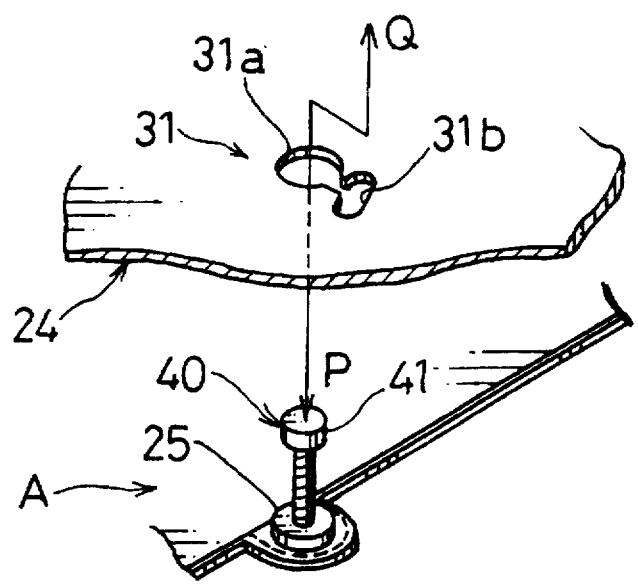
FIG. 7 is an explanatory view showing a relative position between the fixing section and the deformed hole and a moving direction of the optical scanner unit during its installation and removal.

Thereafter, as shown by an arrow P in FIG. 7, first, the optical scanner unit A is moved to a position where the head portion 41 of the fixing vise 40 is fitted into the round hole 31a. For convenience, although the explanation is given only through the deformed hole 31, the same can be said for other deformed holes 32 and 33. Next, by downwardly moving the optical scanner unit A, as the diameter of the round hole 31a is larger than the head portion 41, the optical scanner unit A can be removed from the optical scanner unit fixing plate 24.

Figure 9:
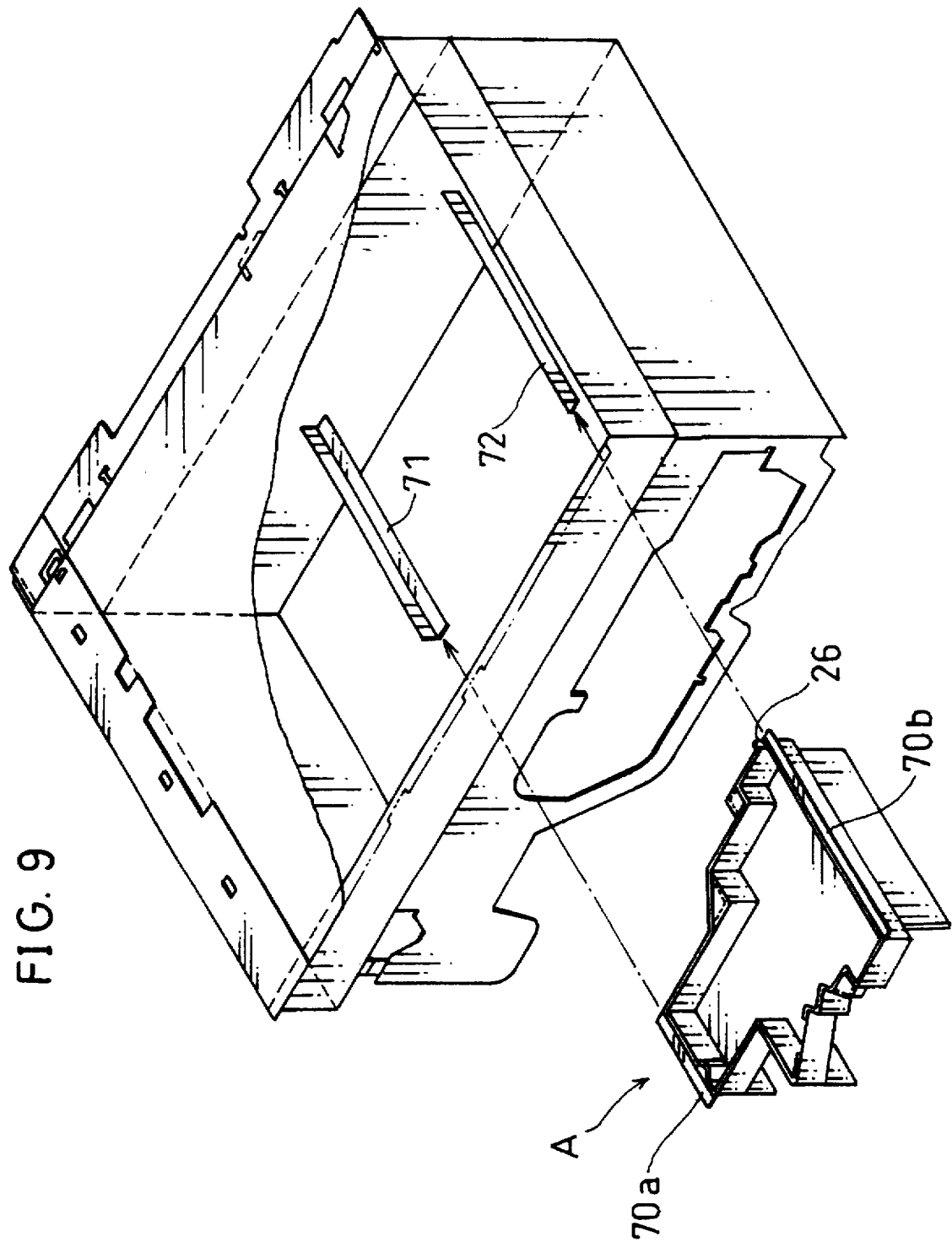
FIG. 9 is a perspective view showing another state of installing an optical scanner unit in a digital image forming apparatus.

Here, the fixing vise 40 is structured such that even when it is completely loosened, the optical scanner unit A can be prevented from being dropped. However, in the case where the optical scanner unit A is placed above the image forming section C, as shown in FIG. 9, guide plates 70a and 70b may be formed on the side of the scanner unit A, while forming L-shaped guide sections 71 and 72 on the side of the main body. In this case, the guide plates 70a and 70b and guide sections 71 and 72 serve as guide members during the installation of the optical scanner unit A while serve as stoppers for preventing the optical scanner unit A from dropping during the removal. Needless to say, an interval in the vertical direction between the guides 71 and 72 is selected to be slightly larger than a distance between the guide plates 70a and 70b so that the optical scanner unit A can rotate about the positioning pin 26 within a predetermined angle.

On the other hand, when placing the optical scanner unit A that has been removed from the digital image forming apparatus on a placement surface, as shown in FIG. 3, the optical scanner unit A can be placed under stable condition by the support projections 62, and as the air-duct wall 29a and the support projections 62 serve as a cushioning member, an impact on precision instruments such as the polygon mirror motor 11, etc., can be alleviated.

Figure 10:
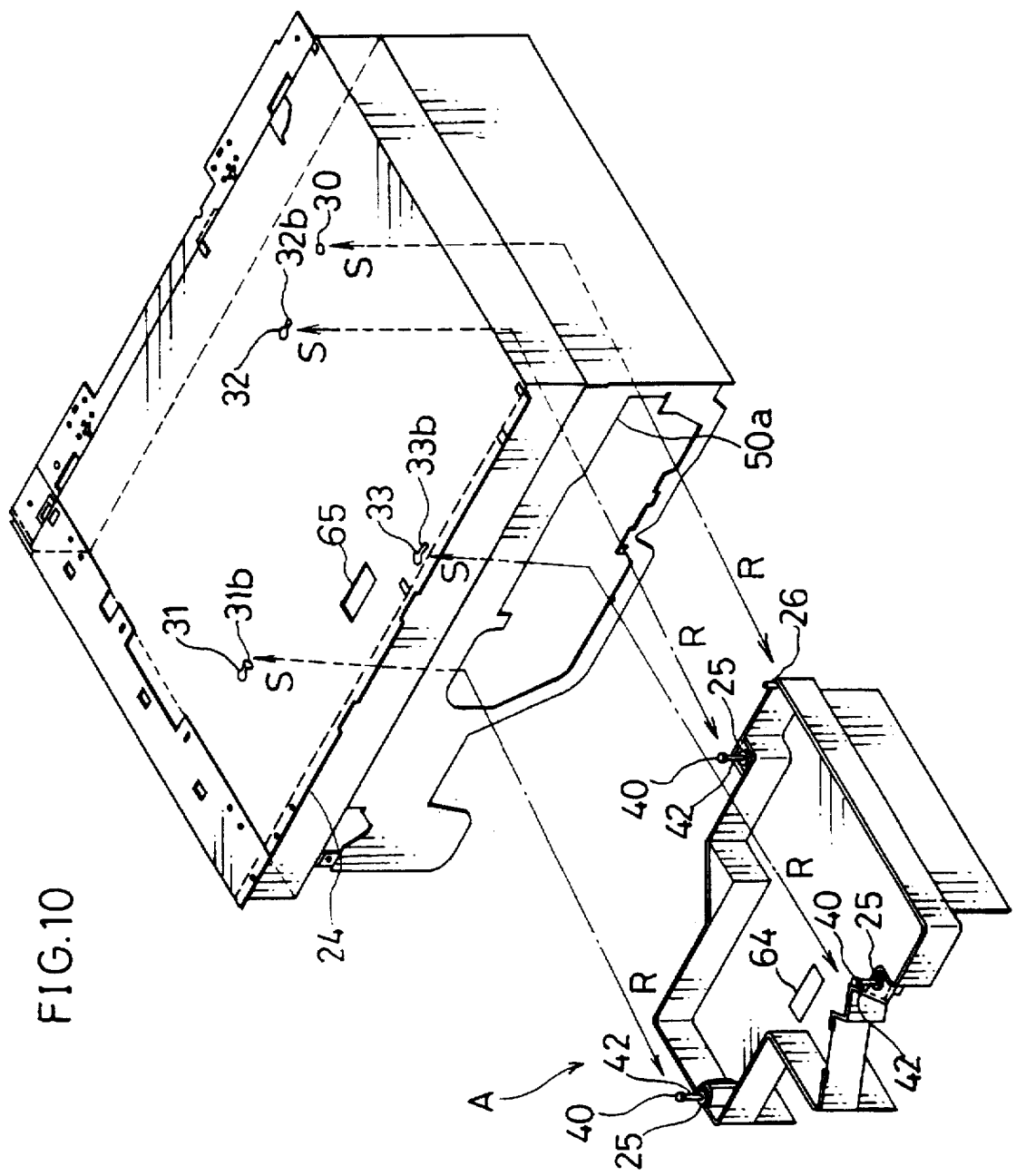
FIG. 10 is a perspective view showing a moving direction of an optical scanner unit when installing it in a digital image forming apparatus.
Figure 11:
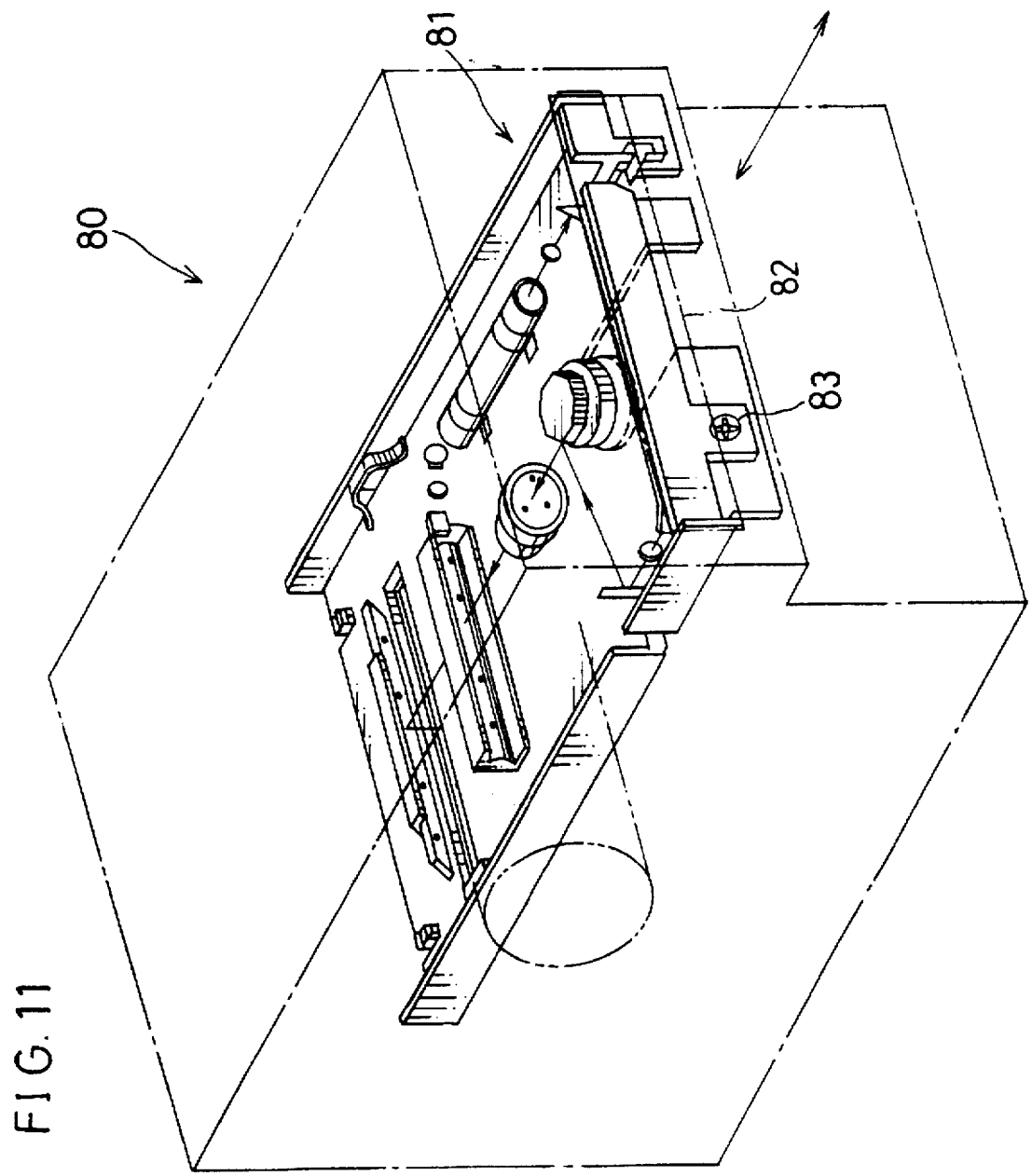
FIG. 11 is a perspective view showing a schematic structure of a conventional digital image forming apparatus in a state where an optical scanner unit is installed therein.

As shown in FIG. 10, the optical scanner unit A has formed thereon a connector 64, while the main body has a connector 65 formed on an optical scanner unit fixing plate 24. These connectors are provided for supplying power to the optical scanner unit A and also for transmitting and receiving a signal. Additionally, these connectors are connected in a vertical direction. According to the described arrangement, when installing and removing the optical scanner unit A on and from the optical scanner unit fixing plate 24, these connectors are also installed and removed at the same time. Therefore, an occurrence of the problem associated with the wiring of a harness such as disconnecting the optical scanner unit A from the main body by inserting therein the harness, etc., can be reduced.

Furthermore, by moving the optical scanner unit A in the direction shown by an arrow R, the optical scanner unit A can be removed through the opening 50a.

The installation of the optical scanner unit A is performed in the following manner. First, the optical scanner unit A is lifted up by inserting a user's hand in the direction shown by an arrow in FIG. 3. Then, as shown in FIG. 1, the optical scanner unit A is moved in a direction of an arrow S from the opening 50a to be mounted on the optical scanner unit fixing plate 24. The subsequent installation process is performed almost in a reversed order of the aforementioned removal process.

Namely, as shown by an arrow Q in FIG. 7, the head portion 41 of the fixing vise 40 is inserted into the round hole 31a so as to be completely projected above the upper surface of the optical scanner unit fixing plate 24. Thereafter, the fixing section 25 of the optical scanner unit A is moved to the arc hole 31b. In this state, even without a support with user's hands, the head portion 41 of the fixing vise 40 can be kept fitted in the arc hole 31b. In the meantime, the fixing vise 40 is not disengaged from the optical scanner unit A by the E-ring 45 shown in FIG. 6. Thus, without tightening the fixing vise 40, the optical scanner unit A can be kept hung on the optical scanner unit fixing plate 24. Here, the same can be said for other deformed holes 32 and 33 when moving the fixing sections 25 in the optical scanner unit A.

When the male threaded portions 42 are moved to the respective arc holes 31b, 32b and 33b, the positioning pin 26 is located substantially below the reference hole 30 formed in the optical scanner unit fixing plate 24. Then, by tightening the fixing vise 40, the positioning pin 26 is fitted into the reference hole 30.

Figure 8:
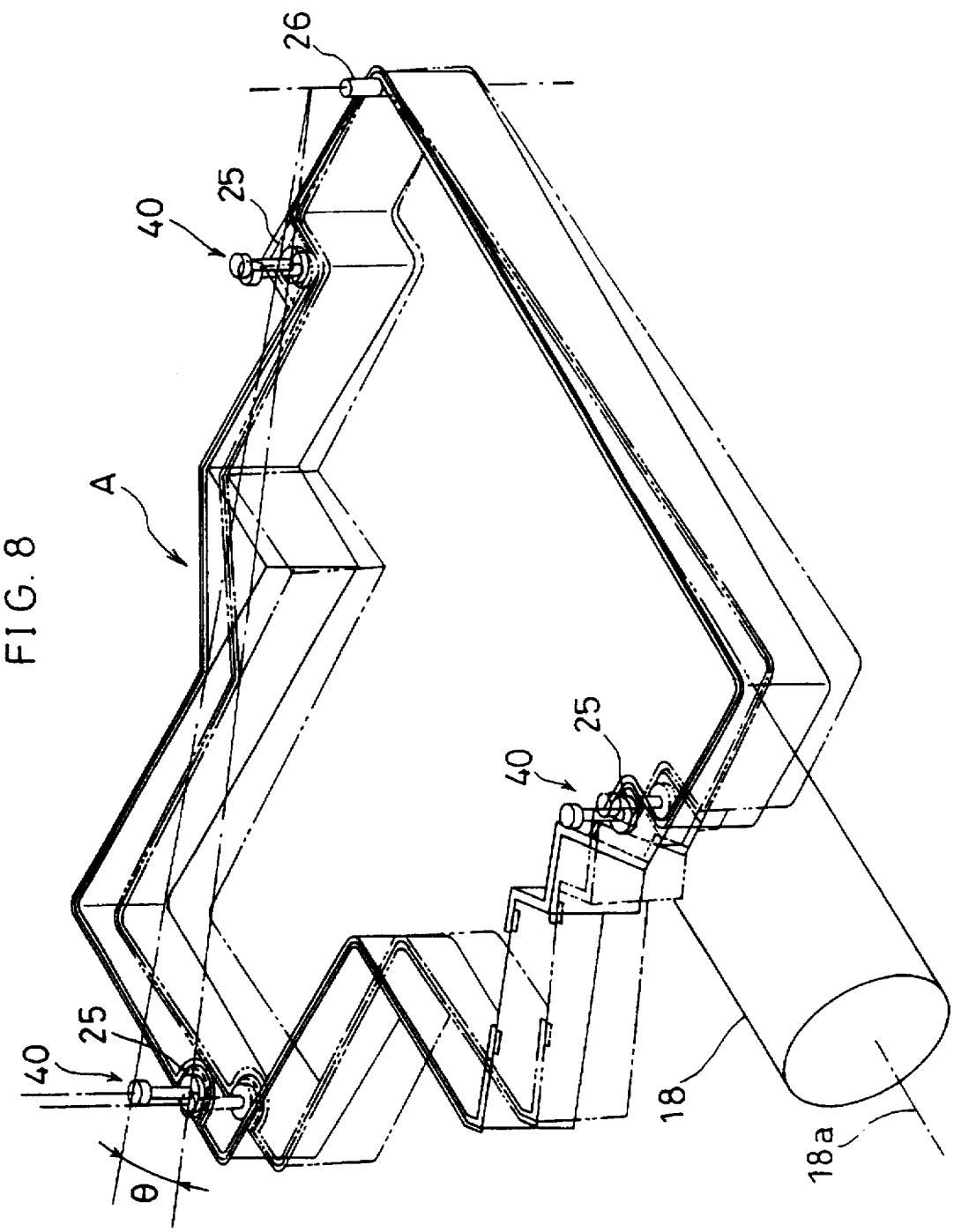
FIG. 8 is an explanatory view showing an adjustable range of an angle of the optical scanner unit with respect to a photoreceptor.

In the state where the positioning pin 26 is fitted therein, as each of the arc holes 31b, 32b and 33b is formed in an arc shape about the reference hole 30, as shown in FIG. 8, the optical scanner unit A can rotate within a predetermined angle θ with respect to the optical scanner unit fixing plate 24. As a result, the optical scanner unit A can be adjusted to a predetermined position. Then, after the angle of the optical scanner unit A has been adjusted, the fixing vises 40 are tightened to the end to complete the installation of the optical scanner unit A.

The adjustment of the angle of the optical scanner unit A is important for the following reason. That is, as the scanning direction of the laser beam is determined by the mounted position of the optical scanner unit A, if the positioning of the optical scanner unit A with respect to the photoreceptor 18 is not accurately carried out, the image would be distorted, resulting in poor quality of the image.

As described, in the present embodiment, the optical scanner unit A is selected so as to be rotatable within an angle θ around the positioning pin 26 fitted in the reference hole 30 along arc holes 31a, 32b and 33b. As this permits a scanning direction to be adjusted parallel to the direction of the axis 18a of the photoreceptor 18, a distortion of the image caused by the displacement of the axis can be prevented.

In addition, the positioning pin 26 which serves as a reference point in adjusting the axis 18a is formed at a corner of the optical scanner unit A in a vicinity of the transmission member 16 corresponding to the laser emitting section. Thus, the one end of the axis 18a on the positioning pin 26 side for positioning the laser beam for use in scanning would not come outside of the surface of the photoreceptor 18. Therefore, the angle of the optical scanner unit A can be adjusted with ease so that the scanning direction coincides with the axis 18a of the photoreceptor 18.

In the present embodiment, to reduce vibrations of the optical scanner unit A received from the image reading section B, an anti-vibration rubber 28 is provided between the bottom surface of the image reading section and the optical scanner unit fixing plate 24.

As described, according to the digital image forming apparatus of the present embodiment, the optical scanner unit A is provided so as to be detachable in a vertical direction with respect to the optical scanner unit fixing plate 24, and the optical scanner unit A can be removed from the main body of the apparatus through the convectional opening 50a provided for removing therethrough the image forming section C. The described arrangement enables the optical scanning unit A to be removed from the main body of the apparatus through the opening 50a in a simplified manner, thereby significantly improving the operability of the maintenance and reducing the burden bared by the operator. Additionally, as the special opening for the optical scanner unit A is not required, an improved degree of freedom in structural design of the apparatus can be achieved. Furthermore, as the scanning direction of the laser beam with respect to the axis 18a of the photoreceptor 18 can be adjusted with ease, the distortion of the image due to the displacement of the scanning line direction can be prevented without difficulties.

In the present embodiment, the optical scanner unit A is removed through the opening 50a provided for removing therethrough the image forming section C. However, it may be arranged such that the image reading section B can be rotated about one side thereof.

According to the described arrangement, even in the case where the opening 50a is not formed in such a manner that the optical scanner unit A cannot pass therethrough, the installation and removal of the optical scanner unit A can be still performed without completely removing the image reading section B.

As described, the digital image forming apparatus in accordance with the present invention includes an image forming section formed under the image reading section for scanning an image and outputting image information, for forming an image on the image holding member, and the optical scanner unit provided between the image reading section and the image forming section for exposing the image holding member by an optical signal converted from the image information to form an electrostatic latent image, wherein the optical scanner unit is secured to be hung on the optical scanner unit fixing surface by plural fixing sections provided on the optical scanner unit.

According to this arrangement, since the optical scanner unit is hung on the fixing surface, for example, by arranging the image reading section so that it can be freely opened and closed, the optical scanner unit can be removed by opening and closing the image reading section, thereby enabling the optical scanner unit to be easily from the main body of the apparatus.

Furthermore, the digital image forming apparatus may be arranged such that the optical scanner unit can be freely removed and installed in the vertical direction, and the opening for removing therethrough the image forming section in horizontal direction may be formed with a size which allows the optical scanner unit to pass therethrough. In this case, since the optical scanner unit can be removed from the main body of the apparatus through such opening, and this permits an elimination of a special opening for the optical scanner unit, an improved degree of freedom on structural design of the apparatus can be achieved. Additionally, as the optical scanner unit can be removed from the apparatus without requiring the installation and removal operation nor opening/closing operation of the image reading section, such removal of the optical scanner unit can be performed with ease.

The digital image forming apparatus may have a fulcrum of the rotation axis between the optical scanner unit and the optical scanner unit fixing plate, for rotating the optical scanner unit about an axis orthogonal and parallel to the image holding member.

In such arrangement, the optical scanner unit is rotatably provided around the fulcrum of the rotation axis within a horizontal surface including a central axis of the image holding member. Therefore, the scanning direction of the laser beam with respect to the central axis can be adjusted with ease, and a distortion of the image caused by the displacement of the scanning direction can be eliminated with ease.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital image forming apparatus, comprising:

an image reading section for outputting image information by scanning an image;

an image holding member;

an image forming section, provided under said image reading section, for forming an image on said image holding member;

an optical scanner unit provided between said image reading section and said image forming section, for exposing said image holding member by an optical signal converted from the image information to form an electrostatic latent image; and an installation and removal unit provided in a main body, for installing and removing said optical scanner unit in a vertical direction, wherein said installation and removal unit has an opening for removing therethrough said image forming section from the apparatus, the opening being formed in such a shape that said optical scanner unit can pass therethrough.

2. The digital image forming apparatus as set forth in claim 1, wherein:

said optical scanner unit includes plural fixing sections;

in an E-ring groove provided at a leading end of a fixing vise provided on each fixing section, fitted is an E-ring having an outer diameter larger than a diameter of the fixing section, said E-ring being detachable from said E-ring groove, said installing and removing unit includes holes, formed at positions corresponding to respective fixing sections, for fitting therein fixing vises respectively and said optical scanner unit is secured to be hung on the installation and removal unit by said fixing vises and E-rings.

3. The digital image forming apparatus as set forth in claim 1, wherein:

said optical scanner unit includes plural fixing sections, each fixing section includes a female threaded member and a fixing vise which is composed of a circular head portion, a male threaded portion and a non-threaded portion continued to the threaded portion, a diameter of the non-threaded portion being smaller than a diameter of a ridge of female threaded members, and in an E-ring groove provided at a leading end of a fixing vise formed on each fixing section, fitted is an E-ring having an outer diameter larger than a diameter of the fixing section, said E-ring being detachable from said E-ring groove, said installation and removal unit is formed so as to mate with respective female threaded members, and has deformed holes, each being composed of a first hole and a second hole which are joined, the first hole having an outer diameter larger than the head portion of the fixing vise, a second hole having an outer diameter smaller than the head portion, and said optical scanner unit is fixed to the installation and removal unit by fitting the male threaded portions into the respective female threaded members.

4. The digital image forming apparatus as set forth in claim 3, wherein:

said optical scanner unit has a positioning pin at a corner, said installation and removal unit has a reference hole for fitting therein the positioning pin, said first hole is a round hole, while said second hole is an arc hole having an arc shape about the reference hole, so that said optical scanner unit can rotate within a plane including a central axis of said image holding member.

5. The digital image forming apparatus as set forth in claim 1, wherein:

said optical scanner unit has an opening for allowing therethrough said optical scanner unit to be supported from a bottom during installation and removal of said optical scanner unit.

6. The digital image forming apparatus as set forth in claim 1, wherein:

said optical scanner unit has a cushioning member, provided on an outer lower surface thereof, for alleviating an impact that occurs when mounting said optical scanner unit on an outside of the main body.

7. The digital image forming apparatus as set forth in claim 6, wherein:

said optical scanner unit includes a motor for controlling an optical path of said optical signal, said motor being configured in such a manner that a bottom surface thereof is projected towards a bottom surface of the optical scanner unit, an air duct formed around said motor for cooling said motor when said optical scanner unit is installed in said apparatus main body, and wherein said cushioning member extends from the bottom surface of said optical scanner unit to a position lower than the bottom surface of said motor so as to surround said motor, and forming thereby a part of said air duct.

8. The digital image forming apparatus as set forth in claim 1, wherein:

said opening is formed in such a position that said image forming section and said optical scanner unit can be installed and removed in a horizontal direction with respect to the main body.

9. The digital image forming apparatus as set forth in claim 1, further comprising:

a first connector provided in said apparatus main body, and a second connector provided in said optical scanner unit, said second connector being capable of being installed and removed in and from said first connector in a vertical direction, said second connector being electrically connected to said first connector when installed.

10. A digital image forming apparatus, comprising:

an image reading section for outputting image information by scanning an image;

an image holding member;

an image forming section, provided under said image reading section, for forming an image on said image holding member;

an optical scanner unit, provided above said image forming section between said image reading section and said image forming section, for exposing said image holding member by an optical signal converted from the image information to form an electrostatic latent image;

an apparatus main body for storing therein said optical scanning unit and said image forming section;

an installation and removal unit located in said apparatus main body for installing and removing said optical scanner unit in a direction perpendicular to a horizontal surface including a central axis of said image holding member;

said apparatus main body having a reference hole formed in the direction perpendicular to the horizontal surface including the central axis of said image holding member, and an opening for installing and removing therethrough said image forming section with respect to the main body, the opening being formed in such a shape that said optical scanner unit can pass therethrough;

said digital image forming apparatus further comprising:

a positioning pin formed at a corner, said positioning pin being fitted in said reference hole when said optical scanner unit is installed in said apparatus main body;

guide plates formed on both side faces of said optical scanner unit;

respective guide members provided so as to correspond to said guide plates, said guide members preventing said optical scanner unit from being dropped when said installation and removal unit removes said optical scanner unit from said apparatus main body and guiding said optical scanner unit thus removed from said opening; and, wherein a predetermined distance is provided between said guide plates and said corresponding guide members such that said optical scanner unit can rotate about said positioning pin within a predetermined angular range.

11. The digital image forming apparatus as set forth in claim 10, wherein:

said optical scanner unit has a cushioning member, provided on an outer lower surface thereof, for alleviating an impact that occurs when mounting said optical scanner unit on an outside of the main body.

12. The digital image forming apparatus as set forth in claim 11, wherein said optical scanner unit includes a motor for controlling an optical path of said optical signal, said motor being configured in such a manner that a bottom surface thereof is projected towards a bottom surface of the optical scanner unit, an air duct is formed around said motor for cooling said motor when said optical scanner unit is installed in said apparatus main body, and wherein said cushioning member extends from the bottom surface of said optical scanner unit to a position lower than the bottom surface of said motor so as to surround said motor, and forming thereby a part of said air duct.

13. The digital image forming apparatus as set forth in claim 10, wherein:

said installation and removal unit includes a fixing vise, and said guide members are located at a position where said guide plates can be supported when the fixing vise is substantially completely loosened.

\* \* \* \* \*